(12) United States Patent
Chin

(10) Patent No.: US 8,156,361 B2
(45) Date of Patent: Apr. 10, 2012

(54) COMPUTER SYSTEM AND POWER SAVING METHOD THEREOF

(75) Inventor: Chung-Ta Chin, Taipei (TW)

(73) Assignee: Asustek Computer Inc., Taipei (TW)

( * ) Notice: Subject to any disclaimer, the term of this patent is extended or adjusted under 35 U.S.C. 154(b) by 510 days.

(21) Appl. No.: 12/211,245

(22) Filed: Sep. 16, 2008

(65) Prior Publication Data

US 2009/0228730 A1 Sep. 10, 2009

(30) Foreign Application Priority Data

Mar. 6, 2008 (TW) .............................. 97107858 A

(51) Int. Cl.
G06F 1/00 (2006.01)
(52) U.S. Cl. ....................................... 713/324; 713/300
(58) Field of Classification Search .................. 713/310, 713/320, 324, 340, 300
See application file for complete search history.

(56) References Cited

U.S. PATENT DOCUMENTS

| | | | | |
|---|---|---|---|---|
| 6,460,143 | B1* | 10/2002 | Howard et al. | 713/323 |
| 6,820,169 | B2* | 11/2004 | Wilcox et al. | 711/105 |
| 7,310,099 | B2* | 12/2007 | Wu et al. | 345/520 |
| 7,325,100 | B2* | 1/2008 | Dhiman et al. | 711/137 |
| 7,631,112 | B2* | 12/2009 | Heo et al. | 710/16 |
| 7,849,334 | B2* | 12/2010 | Juenemann et al. | 713/300 |
| 2002/0152372 | A1 | 10/2002 | Cole et al. | |
| 2002/0161938 | A1* | 10/2002 | Bonomo et al. | 710/5 |
| 2003/0221135 | A1 | 11/2003 | Motoe et al. | |
| 2004/0243797 | A1* | 12/2004 | Yang et al. | 713/2 |
| 2007/0005997 | A1* | 1/2007 | Kardach et al. | 713/300 |

OTHER PUBLICATIONS

CN Office Action mailed Mar. 10, 2010.
Chinese language office action dated Sep. 9, 2010.

* cited by examiner

Primary Examiner — Thomas Lee
Assistant Examiner — Phil Nguyen
(74) Attorney, Agent, or Firm — Thomas|Kayden

(57) ABSTRACT

A computer system includes a system chip and a plurality of peripheral devices. The system chip includes a plurality of modules. Each module includes a controller. Each controller receives an independent power supply and is powered on or off according to a GPIO port signal. The peripheral devices via connectors or slots connect to corresponding controllers. When parts of controllers do not connect to peripheral devices, the controllers that are not connected are powered off to reduce the power consumption of the system chip.

9 Claims, 2 Drawing Sheets

COMPUTER SYSTEM AND POWER SAVING METHOD THEREOF

CROSS REFERENCE TO RELATED APPLICATIONS

This application claims priority of Taiwan Patent Application No. 097107858, filed on Mar. 6, 2008, the entirety of which is incorporated by reference herein.

BACKGROUND OF THE INVENTION

1. Field of the Invention

The invention relates to a power saving circuit, and more particularly, to a power saving circuit applied in computer systems.

2. Description of the Related Art

In a conventional computer system, all peripheral devices will be waked up when powered on. In other words, all controller chips corresponding to the peripheral devices will also be activated for operation.

However, users may not utilize all of the computer peripheral devices all the time or users may only utilize some computer peripheral devices during a specific time period. The peripheral devices which are not frequently used and controller chips corresponding thereto, however, still consume power, thus causing the conventional computer systems to inefficiently utilize and waste power.

Five ACPI (Advanced Configuration and Power Interface) states, such as S0, S1, S3, S4 and S5 states, are commonly utilized in computer systems. However, computer systems can only normally operate in the S0 state, while computer systems enter a sleep state in the S1-S5 states. Thus, while computer system power can be saved, computer system operation is inconvenient.

BRIEF SUMMARY OF THE INVENTION

A power saving method for use in a system chip of a computer system is disclosed, wherein the system chip comprises a plurality of controllers, and each controller have a GPIO (General-Purpose Input/Output) port respectively connected to a detecting connection element. The power saving method comprises detecting a state of each of the GPIO ports to determine whether the detecting connection element is connected to a peripheral device when the computer system is powered on. Additionally, the power saving method comprises when detecting that the detecting connection element is not connected to the peripheral device, powering off the controller that is not connected to the peripheral device by the system chip, and directing a basic input output system (BIOS) to initialize the controllers which are not powered off.

A computer system connected to a plurality of peripheral devices is further disclosed, comprising a plurality of detecting connection elements and a system chip. A detecting connection signal is generated when detecting that one of the detecting connection elements and the corresponding peripheral devices connect. The system chip has a power supplier providing at least one voltage level and a plurality of modules. Each module comprises a controller and each controller comprises a GPIO port respectively connected to one of the detecting connection elements. When any of the GPIO ports receives the detecting connection signal, the power supplier provides the voltage level to the controller corresponding to the GPIO port receiving the detecting connection signal. When any of the GPIO ports do not receive the detecting connection signal, the power supplier stops providing the voltage level to the controller corresponding to the GPIO port.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In a computer system, a South-Bridge chip is commonly utilized to transmit data to or receiver data from external controller chips and peripheral devices of the computer system. Due to increased integration and higher density requirements, external controller chip have been integrated into the South-Bridge chip.

According to embodiments of the invention, the South-Bridge chip is modulized such that a South-Bridge chip has a plurality of modules (controllers), and each module is connected to a GPIO (general-purpose input/output) port for receiving a GPIO port signal and an independent power. Each module determines whether to initialize the corresponding controller according to the GPIO port signal thereof. If the controller is determined to be initialized, the controller is powered on; otherwise, if the controller is determined not to be initialized, the controller is powered off.

Figure 1:
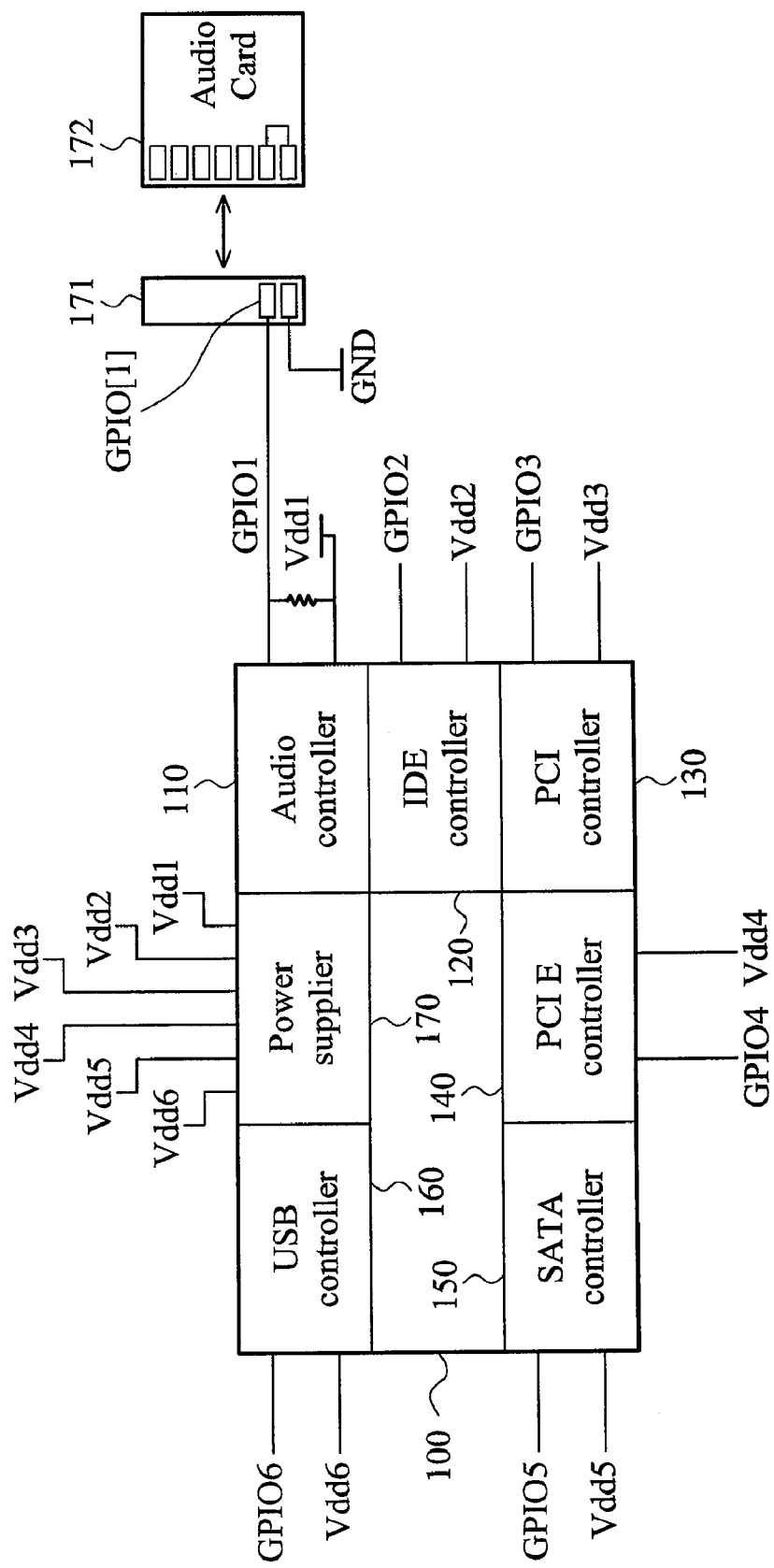
FIG. 1 shows an embodiment of a South-Bridge chip of a computer system according to the invention.

FIG. 1 shows an embodiment of a South-Bridge chip 100 of a computer system according to the invention. The South-Bridge chip 100 has a plurality of modules, and each module has a corresponding controller and each controller has a GPIO (General-Purpose Input/Output) port. Each GPIO port respectively connects to a detecting connection element such as a connection slot 171 as shown in FIG. 1 or a similar connection element to form the detecting connection element.

As shown in FIG. 1, the South-Bridge chip 100 includes an Audio controller 110, an IDE controller 120, a PCI controller 130, a PCIE controller 140, a SATA controller 150 and a USB controller 160. The Audio controller 110 receives a GPIO port signal GPIO1 and a power Vdd1, the IDE controller 120 receives a GPIO port signal GPIO2 and a power Vdd2, the PCI controller 130 receives a GPIO port signal GPIO3 and a power Vdd3, the PCIE controller 140 receives a GPIO port signal GPIO4 and a power Vdd4, the SATA controller 150 receives a GPIO port signal GPIO5 and a power Vdd5, and the USB controller 160 receives a GPIO port signal GPIO6 and a power Vdd6.

Moreover, the South-Bridge chip 100 further includes a power supplier 170 for providing at least one power. In a normal case, same voltage level power sources are utilized. However, in this embodiment, different power sources Vdd1-Vdd6 are utilized to provide a variety of power levels to different controllers. When any of the peripheral devices is connected to the computer system, such as an audio card 172 to an Audio controller 110, the audio card 172 connects together two of its pins and a connector or connection slot 171 that corresponds to the detecting connection element to the ground and couples another one to the GPIO port of the Audio controller 110. When one of the computer peripheral devices connects to the computer system, the corresponding GPIO port receives the detecting connection signal, i.e. when the GPIO port signal is at a low voltage level, the power supplier 170 provides a specific power level to the controller corresponding to the GPIO port. When none of the GPIO ports receive the detecting connection signal, i.e. when the GPIO port signal is at a high voltage level, the power supplier 170 stops providing a specific power level to the controller corresponding to the GPIO port.

According to one embodiment of the invention, the Audio controller 110 is determined to be powered on or powered off according to the GPIO port signal GPIO1. The Audio controller 110 is powered on to receive the power Vdd1 when the GPIO port signal is at a low voltage level while the Audio controller 110 is powered off when the GPIO port signal is at a high voltage level. The Audio controller 110 may detect whether the audio card 172 is connected to the computer system via the connector or the connection slot 171 (connecting element or detecting connection element). For example, when the audio card 172 connects to the connection slot 171 of the computer system, the GPIO port GPIO [1] of the connection slot 171 will be coupled to the ground power GND so that the GPIO port signal GPIO1 is at a low voltage level. When the audio card 172 is not connected to the connection slot 171 of the computer system, the GPIO port signal GPIO1 of the GPIO port GPIO [1] is at a high voltage level. Similarly, the IDE controller 120, the PCI controller 130, the PCIE controller 140, the SATA controller 150 and the USB controller 160 may also be determined to be powered on or off according to the corresponding GPIO port signal.

Figure 2:
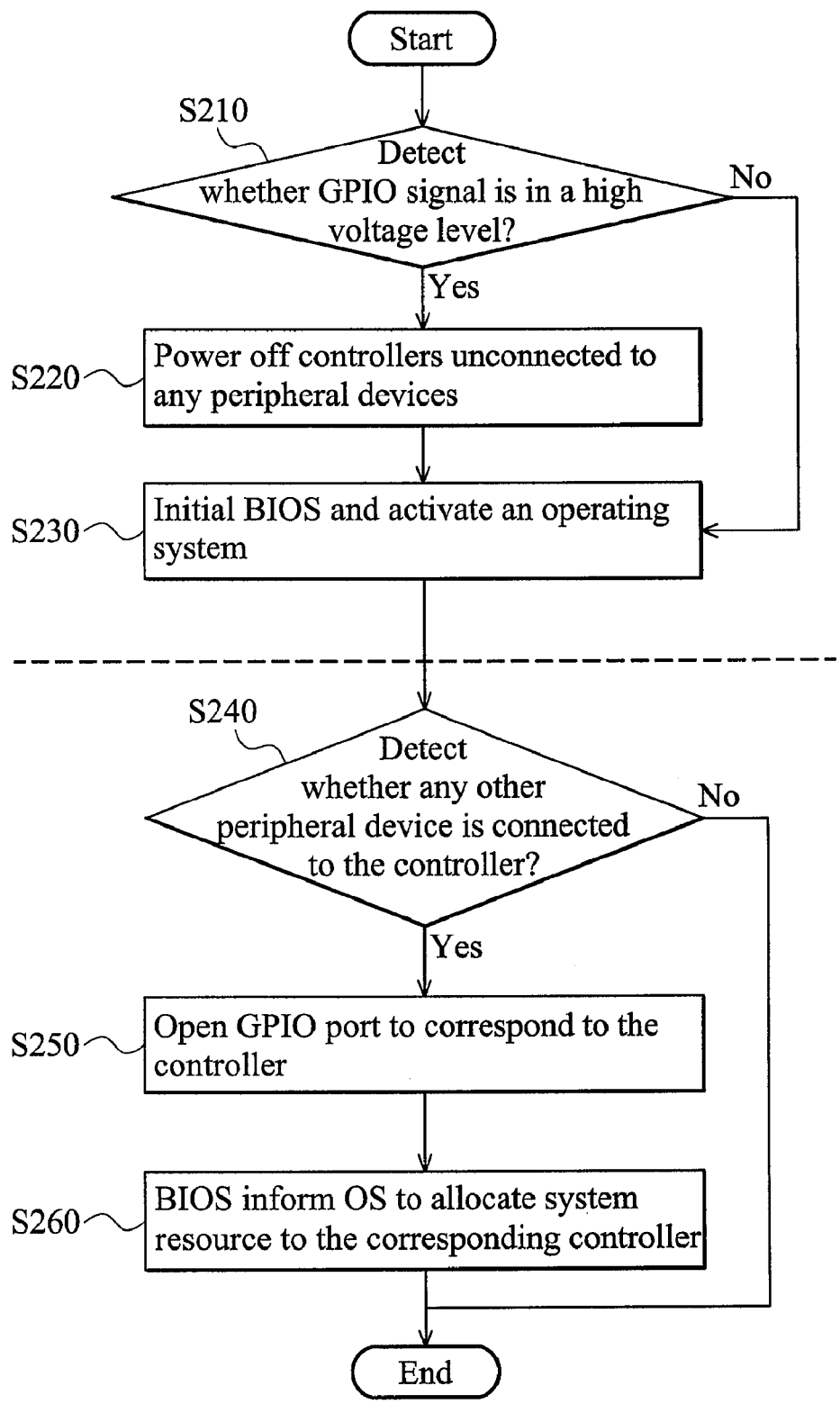
FIG. 2 is a flowchart showing another embodiment of a power saving method according to the invention.

FIG. 2 is a flowchart showing another embodiment of a power saving method according to the invention. Referred together with FIG. 1, when the computer system is powered on, voltage levels of all of the GPIO port signals are detected to determine whether the corresponding controllers via the connection element are connected to the peripheral devices (step S210). For example, voltage levels of the GPIO ports GPIO1-GPIO6 are detected. When controllers are not connected to the peripheral devices via the connection element, voltage levels of the corresponding GPIO ports GPIO1-GPIO6 are high and thus the corresponding controllers are powered off for reducing power consumption of the system chip (step S220). Note that powering off the corresponding controllers not connected to the peripheral devices is performed by powering off the power supplier 170 of the southbridge chip 100 to stop sending a power level to the corresponding controllers. When all of the GPIO ports GPIO1-GPIO6 are at low voltage levels, the flow goes to step S230. According to one embodiment, only an audio card is connected to the computer system and no other peripheral devices are connected to the corresponding controllers so that only the GPIO port signal GPIO1 is at a low voltage level while other GPIO port signals GPIO2-GPIO6 are at high voltage levels. Therefore, the Audio controller 110 is powered on due to the low voltage level of the GPIO port signal GPIO1 while the IDE controller 120, the PCI controller 130, the PCIE controller 140, the SATA controller 150 and the USB controller 160 are powered off due to the high voltage level of each of the GPIO port signals GPIO2-GPIO6. Thereafter, the BIOS (basic input/output system) initializes the controllers which are not powered off and activates an OS (operating system) after the initializations are finished (step S230).

According to another embodiment of the invention, after the computer system activates the OS, whether another peripheral device is connected to one of the controllers is sought (step S240). When detecting that another peripheral device is connected to a corresponding controller via the connection element according to the GPIO port signal, the corresponding controller is powered on by the GPIO port (step S250). After the corresponding controller has been powered on, the BIOS informs the OS to allocate system resources to the corresponding controller (step S260).

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A power saving method for use in a system chip of a computer system, wherein the system chip comprises a plurality of controllers, and each controller has a GPIO (General-Purpose Input/Output) port that is respectively connected to a detecting connection element, comprising:
   detecting a state of each of the GPIO ports to determine whether the detecting connection element is connected to a peripheral device when the computer system is powered on;
   when detecting that the detecting connection element is not connected to the peripheral device, powering off the controller that is not connected to the peripheral device by the system chip;
   directing a basic input output system (BIOS) to initialize the controllers which are not powered off;
   activating an operating system after controllers which are not powered off have been initialized by the basic input output system (BIOS); and
   powering on the controller corresponding to the detecting connection element if one of the detecting connection elements connected to one of the peripheral devices has been detected after activating the operating system;
   wherein the basic input output system (BIOS) further informs the operating system to allocate system resources to the controller after the controller has been powered on.

2. The power saving method as claimed in claim 1, wherein when detecting that the state of the GPIO port is at a high voltage level, determining that the corresponding controller is not connected to the peripheral device.

3. The power saving method as claimed in claim 1, wherein the step of powering off the controller that is not connected to the peripheral device is performed by powering off a power supplier of the system chip to stop sending a voltage level to the controller via the GPIO port.

4. A computer system connected to a plurality of peripheral devices, comprising:
   a plurality of detecting connection elements, generating a detecting connection signal when detecting that one of the detecting connection elements and the peripheral devices have a corresponding connection; and
   a system chip, having a power supplier providing at least one voltage level, a plurality of modules and a basic input output system (BIOS), wherein each module comprises a controller and each controller comprises a GPIO port respectively connected to a corresponding one of the detecting connection elements,
   wherein when one of the GPIO ports receives the detecting connection signal, the power supplier provides the voltage level to the controller corresponding to the GPIO port, and when one of the GPIO ports does not receive the detecting connection signal, the power supplier stops providing the voltage level to the controller corresponding to the GPIO port;

wherein the basic input output system (BIOS) initializes the controllers which are not powered off and activates an operating system; and the system chip powers on the controller corresponding to the detecting connection element if one of the detecting connection elements connected to one of the peripheral devices has been detected after activating the operating system;

wherein the basic input output system (BIOS) further informs the operating system to allocate system resources to the controller after the controller has been powered on.

5. The computer system as claimed in claim 4, wherein the detecting connection elements are a plurality of connectors.

6. The computer system as claimed in claim 4, wherein the detecting connection elements are a plurality of slots.

7. The computer system as claimed in claim 4, wherein the detecting connection elements are formed by at least one connector and at least one slot.

8. The computer system as claimed in claim 4, wherein the detecting connection signal is a ground voltage provided by one of the peripheral devices.

9. A system chip connected to at least one detecting connection element, wherein when the detecting connection element is connected to a peripheral device, the detecting connection element generates a detecting connection signal, and the system chip comprising:

a power supplier providing at least one voltage level; and a plurality of modules, each comprising a respective controller, wherein each controller comprises a GPIO port respectively connected to a corresponding one of the detecting connection elements; and a basic input output system (BIOS), wherein when one of the GPIO ports receive the detecting connection signal, the power supplier provides the voltage level to the controller corresponding to the GPIO port receiving the detecting connection signal, and when one of the GPIO ports do not receive the detecting connection signal, the power supplier stops providing the voltage level to the controller corresponding to the GPIO port;

wherein the basic input output system (BIOS) initializes the controllers which are not powered off and activates an operating system; and the system chip powers on the controller corresponding to the detecting connection element if one of the detecting connection elements connected to one of the peripheral devices has been detected after activating the operating system;

wherein the basic input output system (BIOS) further informs the operating system to allocate system resources to the controller after the controller has been powered on.

\* \* \* \* \*